United States Patent Office 3,378,599
Patented Apr. 16, 1968

3,378,599
PROCESS FOR THE PREPARATION OF POLYALKYLCYCLOHEXENES
Masataka Amagasa and Tadashi Yamaguchi, Sendai-shi, Japan, assignors to Chiyoda Kakokensetsu Kabushiki Kaisha, Tokyo, Japan, a corporation of Japan
No Drawing. Filed Mar. 17, 1965, Ser. No. 440,640
4 Claims. (Cl. 260—667)

This invention relates to a process for the production of polyalkylcyclohexenes and more particularly to provide a process for the production of compounds described by the following general formula:

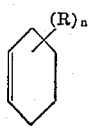

wherein R is alkyl group and n is 2 or 3, from the compounds which are described by the following general formula:

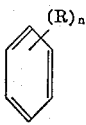

wherein R and n are as defined before, by using at least one alkali metal or alkaline earth metal as a reducing agent in liquid ammonia in the presence or absence of a proton donor.

The present invention provides a process for the selective production of polyalkylcyclohexenes which can not be obtained easily by conventional methods of catalytic reduction or other methods of reduction.

It is known that liquid ammonia dissolves many organic and inorganic compounds and is a solvent having quite particular properties.

Above all, liquid ammonia dissolves alkali metals or alkaline earth metals remarkably well to form a blue liquid ammonia solution. Various characteristic reactions have been found in liquid ammonia, and especially many examples of reducing organic compounds by use of an alkali metal or a alkaline earth metal as a reducing agent in liquid ammonia have been known.

However, the applications of such reducing agents to polyalkylbenzenes are known in very few cases, and that dihydro-compounds only are obtained as reduction products in such reaction conditions.

In addition, methyl alcohol and ethyl alcohol is used as the proton donor in an amount equivalent or greater than equivalent to the reducing agents such as metallic sodium.

It has now been discovered that polyalkylcyclohexenes are produced selectively in one step by the use of a proton donor in an amount less than equivalent to the reducing agent. This novel reaction has been unperceived in reduction methods which are carried out by the use of an alkali metal or alkaline earth metal in liquid ammonia.

The finding of this new fact is very significant for the basic reaction and its application.

One of the objects of the present invention is to produce polyalkylcyclohexenes from polyalkylbenzenes selectively.

A more specific object is to carry out the selective reduction in liquid ammonia.

Still further objects and the entire scope of applicability of the present invention will become apparent from the detailed description given hereinafter.

It is presumed that many dialkylcyclohexene isomers are produced by the partial reduction of dialkylbenzene such as 1,4 - dimethyl - (1) - cyclohexene or 1,4 - dimethyl - (2) - cyclohexene from p-xylene, 1,3-dimethyl-(3)-cyclohexene, 1,3 - dimethyl - (4) - cyclohexene and 1,3-dimethyl-(5)-cyclohexene from m-xylene, 1,2-dimethyl - (1) - cyclohexene, 1,2 - dimethyl - (2) - cyclohexene, 1,2 - dimethyl - (3) - cyclohexene, and 1,2-dimethyl-(4)-cyclohexene from o-xylene.

However, according to the process of the present invention, special isomers only are readily produced, such as 1,4-dimethyl-(1)-cyclohexene from p-xylene, 1,3-dimethyl-(1)-cyclohexene from m-xylene, 1,2-dimethyl-(1)-cyclohexene from o-xylene.

In the same way, 1,3,5-trimethyl-(1)-cyclohexene is produced from 1,3,5-trimethylbenzene.

As revealed in the aforementioned examples, polyalkylbenzenes consisting of 2 to 3 alkyl radicals having from 1 to 3 carbon atoms are employed as a raw material.

The reaction wherein aforesaid raw materials are employed may be carried out in the presence or absence of a proton donor by using a reducing agent in liquid ammonia.

Thus, as the reducing agents, alkali metals such as lithium, sodium, and potassium and alkaline earth metals such as calcium, strontium and barium may be used. However, in view of the solubility to the reactant and for commercial application, the use of metallic sodium is preferred.

In accordance with the present invention, the proton donors such as water, alcohols and so-called "ammono acids" (see Sisler, "Chemistry in Non-Aqueous Solvents" [1961] published by Reinhold Publishing Corporation) may be used, as long as they become proton donors in liquid ammonia. However, from the commercial point of view, the use of water is the most preferable, since it may be easily separated and recovered quantitatively from the reaction product as NaOH or KOH after the completion of the reaction.

The selective reduction is effected in the presence of a proton donor in an amount less than equivalent to that of reducing agent. When a system of liquid ammonia, polyalkylbenzene and reducing agent is heated in the absence of proton donor, liquid ammonia itself partially acts as a decomposing agent (proton donor) to obtain polyalkylcyclohexene selectively. The temperature may be varied remarkably over a wide range and is preferably determined in the range of −50 to 130° C.

The following examples are merely illustrative and do not imply any limitation.

EXAMPLE 1

200 cc. of liquid ammonia, 22 g. of m-xylene and 18 g. of water were placed into a 500 cc. cylindrical pressure vessel equipped with a stirrer, a valve (A) for exhausting gas and introducing liquid at the top, a device (B) for introducing alkali metals by pressure, and a valve (C) for discharging liquid at the lower portion. Stirring the mixture, 20 g. of metallic sodium was gradually pressed into the said vessel at 0° C. through the device (B).

After the metallic podium had been added, the mixture was left standing for about 2 hours and ammonia was recovered from the valve (A). Thereafter, 100 cc. of water was gradually added to the residue through the valve (A) and discharged through the valve (C).

The resulting solution was composed of two liquid phases, from which an oil layer could be easily separated.

20 g. of oil layer was analyzed by gas chromatography. It was found that 17 g. of

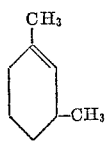

was obtained and the residue was unreacted m-xylene. In this reaction, the metallic sodium may be added in the form of a metallic sodium liquid ammonia solution. The order of addition of the proton donor and the reducing agent may be altered.

After the completion of the reaction, the resulting sodium hydroxide may be recovered by filtration.

EXAMPLE 2

200 cc. of liquid ammonia, 22 g. of p-xylene and 8 g. of water were placed in a pressure vessel in the same manner as in Example 1.

Stirring the above-mentioned compounds, 20 g. of metallic sodium were forced into the vessel at 0° C. by the method as in Example 1, and then the same treatment as in Example 1 was carried out, and 20 g. of oil which were composed of 18 g. of 1,4-dimethyl-(1)-cyclohexene and unreacted p-xylene was obtained.

EXAMPLE 3

200 cc. of liquid ammonia, 22 g. of m-xylene and 19 g. of ethyl alcohol were placed in a pressure vessel in the same way as in Example 1.

Stirring the above-mentioned compounds 32 g. of metallic potassium were forced into the vessel at −10° C. and then the same treatment as in Example 1 was carried out. 15 g. of 1,4-dimethyl-(1)-cyclohexene and 6 g. of unreacted m-xylene were obtained.

EXAMPLE 4

150 cc. of liquid ammonia, 20 g. of p-xylene and 10 g. of metallic sodium were fed into the same pressure vessel as in Example 1.

The mixture was reacted for about 6 hours at 100° C. and then cooled to room temperature.

150 cc. of liquid ammonia dissolving 25 g. of ammonium chloride was poured into the reaction mixture. Ammonia was recovered from the valve (A), and then the same treatment as in Example 1 was carried out.

6 g. of 1,4-dimethyl-(1)-cyclohexene and unreacted p-xylene were obtained.

EXAMPLE 5

200 cc. of liquid ammonia, 22 g. of p-xylene and 19 g. of ethyl alcohol were placed in a pressure vessel in the same manner as in Example 1.

Stirring the above-mentioned compounds, 32 g. of metallic potassium were forced into the vessel at −10° C. by the method as in Example 1, and then the same treatment as in Example 1 was carried out.

15 g. of 1,4-dimethyl-(1)-cyclohexene and 6 g. of unreacted p-xylene were obtained.

EXAMPLE 6

200 cc. of liquid ammonia, 24 g. of 1,3,5-trimethylbenzene and 8 g. of water were placed in a pressure vessel in the same manner as in Example 1.

Stirring the above-mentioned compounds, 20 g. of metallic sodium were forced into the vessel at 10° C. by the method as in Example 1, and then the same treatments as in Example 1 was carried out.

18 g. of 1,3,5-trimethyl-(1)-cyclohexene and 5 g. of unreacted 1,3,5-trimethylbenzene were obtained.

EXAMPLE 7

120 cc. of liquid ammonia, 22 g. of m-xylene and 17 g. of metallic calcium were placed into a vessel. 80 cc. of liquid ammonia containing 8 g. of water were then added dropwise at −20° C.

After the completion of the addition, the mixture was standing for 5 hours. Recovering ammonia by evaporation, 100 cc. of water was gradually added, and then the oil layer was separated.

19 g. of 1,3-dimethyl-(1)-cyclohexene and unreacted raw material were obtained from the oil layer.

Instead of m-xylene in the above-mentioned method, p-xylene was used as a raw material.

1,4-dimethyl-(1)-cyclohexene was obtained.

What we claim is:

1. A process for the production of polyalkylcyclohexenes which consists essentially in reacting in liquid ammonia a compound of the formula

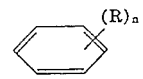

wherein R is an alkyl group of from 1–3 carbon atoms and n is 2 or 3, with a reducing agent selected from the group consisting of alkali metals and alkaline earth metals in the presence of a proton donor, said proton donor being present in an amount less than equivalent to said reducing agent.

2. A process as set forth in claim 1 wherein the proton donor is selected from the group consisting of water, alcohols, and ammono acids.

3. A process as set forth in claim 1 wherein the compound is a xylene, the reducing agent is sodium, and the proton donor is water.

4. A process as set forth in claim 1 wherein the compound is a xylene, the reducing agent is sodium and the proton donor is ammonium chloride.

References Cited

UNITED STATES PATENTS

| | | | |
|---|---|---|---|
| 2,182,242 | 12/1939 | Wooster | 260—667 |
| 2,432,843 | 12/1947 | Whitman | 260—667 |
| 2,443,016 | 6/1948 | Whitman | 260—667 |
| 3,016,409 | 1/1962 | Vesely | 260—667 |
| 3,274,272 | 9/1966 | Amagasa et al. | 260—667 |

SAMUEL P. JONES, *Primary Examiner.*

DELBERT E. GANTZ, *Examiner.*